United States Patent
Nguyen et al.

(10) Patent No.: US 12,356,292 B1
(45) Date of Patent: *Jul. 8, 2025

(54) APPARATUS AND METHOD FOR ASSET TRACKING FOR METAL WASTE AND RECYCLING CONTAINERS

(71) Applicant: WM Intellectual Property Holdings, L.L.C., Houston, TX (US)

(72) Inventors: Vu Nguyen, Houston, TX (US); Brian Hertz, Houston, TX (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/780,136

(22) Filed: Jul. 22, 2024

Related U.S. Application Data

(60) Provisional application No. 63/542,716, filed on Oct. 5, 2023, provisional application No. 63/528,235, filed on Jul. 21, 2023.

(51) Int. Cl.

| | | |
|---|---|---|
| *G08B 1/08* | (2006.01) | |
| *G01S 19/16* | (2010.01) | |
| *G01S 19/42* | (2010.01) | |
| *G01S 19/52* | (2010.01) | |
| *G06Q 10/30* | (2023.01) | |
| *H04W 4/029* | (2018.01) | |

(52) U.S. Cl.
CPC ............. *H04W 4/029* (2018.02); *G01S 19/16* (2013.01); *G01S 19/42* (2013.01); *G01S 19/52* (2013.01); *G06Q 10/30* (2013.01)

(58) Field of Classification Search
CPC ........ H04W 4/029; G01S 19/16; G01S 19/42; G01S 19/52; G06Q 10/30
USPC ..................................................... 340/539.13
See application file for complete search history.

(56) References Cited

U.S. PATENT DOCUMENTS

| | | | |
|---|---|---|---|
| 6,484,035 | B2 | 11/2002 | Allen, Jr. |
| 6,510,380 | B1 | 1/2003 | Curatolo |
| 6,560,536 | B1 | 5/2003 | Sullivan |
| 6,606,556 | B2 | 8/2003 | Curatolo |
| 6,753,775 | B2 | 6/2004 | Auerbach |
| 6,889,135 | B2 | 5/2005 | Curatolo |
| 7,072,668 | B2 | 7/2006 | Chou |
| 7,187,278 | B2 | 3/2007 | Biffar |
| 7,321,774 | B1 | 1/2008 | Lau |
| 7,339,469 | B2 | 3/2008 | Braun |

(Continued)

FOREIGN PATENT DOCUMENTS

| | | |
|---|---|---|
| CA | 2819534 A1 | 12/2013 |
| JP | H09147963 A | 6/1997 |

(Continued)

*Primary Examiner* — Tai T Nguyen
(74) *Attorney, Agent, or Firm* — Greenberg Traurig LLP

(57) ABSTRACT

Systems and methods are provided for asset tracking for metal waste and recycling containers. A low-cost GPS location asset tracker can be provided for tracking the whereabouts of metal waste and recycling containers. The asset tracker can include a housing attachable to the metal waste container, a primary control board, an accelerometer, one or more battery packs, and a tracking system consisting of a GPS receiver, a GPS antenna, a cellular transceiver, and a cellular antenna traced directly onto the primary control board.

6 Claims, 17 Drawing Sheets

(56) References Cited

U.S. PATENT DOCUMENTS

| | | |
|---|---|---|
| 7,375,619 B2 | 5/2008 | Auerbach |
| 7,529,561 B2 | 5/2009 | Heinonen |
| 7,714,778 B2 | 5/2010 | Dupray |
| 7,848,905 B2 | 12/2010 | Troxler |
| RE42,435 E | 6/2011 | Katz |
| 7,978,065 B2 | 7/2011 | Schnitz |
| 7,978,067 B2 | 7/2011 | Wagner |
| 8,009,034 B2 | 8/2011 | Dobson |
| 8,058,985 B2 | 11/2011 | Dobson |
| 8,135,413 B2 | 3/2012 | Dupray |
| 8,154,421 B2 | 4/2012 | Saltzman |
| 8,203,451 B2 | 6/2012 | Evans |
| 8,223,009 B2 | 7/2012 | Anderson |
| 8,255,149 B2 | 8/2012 | Brosius |
| 8,258,942 B1 | 9/2012 | Lanzone |
| 8,319,643 B2 | 11/2012 | Evans |
| 8,321,124 B2 | 11/2012 | Curatolo |
| 8,330,059 B2 | 12/2012 | Curotto |
| 8,428,913 B2 | 4/2013 | Troxler |
| 8,461,958 B2 | 6/2013 | Saenz |
| 8,489,113 B2 | 7/2013 | Walter |
| 8,611,920 B2 | 12/2013 | Lau |
| 8,620,343 B1 | 12/2013 | Lau |
| 8,626,568 B2 | 1/2014 | Warkentin |
| 8,674,243 B2 | 3/2014 | Curotto |
| 8,773,262 B2 | 7/2014 | Bae |
| 8,779,933 B2 | 7/2014 | Hartmann |
| 8,830,124 B1 | 9/2014 | Akbari |
| 8,862,378 B2 | 10/2014 | Curatolo |
| 8,890,683 B2 | 11/2014 | Schnitz |
| 8,978,467 B2 | 3/2015 | Wagner |
| 9,013,306 B2 | 4/2015 | Koh |
| 9,020,527 B2 | 4/2015 | Lee |
| 9,253,752 B2 | 2/2016 | Lee |
| 9,347,818 B2 | 5/2016 | Curotto |
| 9,355,381 B2 | 5/2016 | Chakraborty |
| 9,368,007 B2 | 6/2016 | Vogt |
| 9,402,160 B2 | 7/2016 | Lee |
| 9,424,722 B2 | 8/2016 | Adrezin |
| 9,472,125 B2 | 10/2016 | Debrody |
| 9,525,193 B2 | 12/2016 | Lee |
| 9,607,281 B2 | 3/2017 | Lee |
| 9,618,496 B2 | 4/2017 | Troxler |
| 9,648,456 B2 | 5/2017 | Jordan |
| 9,720,480 B2 | 8/2017 | Gregory |
| 9,774,410 B2 | 9/2017 | Daoura |
| 9,786,146 B2 | 10/2017 | Markwell |
| 9,794,942 B1 | 10/2017 | Arrakoski |
| 9,813,850 B2 | 11/2017 | Lee |
| 9,841,506 B2 | 12/2017 | Brosius |
| 9,875,626 B2 | 1/2018 | Vogt |
| 9,913,087 B2 | 3/2018 | Jordan |
| 9,915,559 B2 | 3/2018 | Radcliff |
| 9,989,649 B2 | 6/2018 | Buck, Jr. |
| 10,140,830 B2 | 11/2018 | Markwell |
| 10,152,737 B2 | 12/2018 | Lyman |
| 10,222,853 B2 | 3/2019 | Suh |
| 10,320,081 B2 | 6/2019 | Man |
| 10,395,076 B2 | 8/2019 | Phillips |
| 10,420,325 B2 | 9/2019 | Czarnecky |
| 10,497,289 B2 | 12/2019 | Debrody |
| 10,524,083 B2 | 12/2019 | Krzych |
| 10,602,244 B2 | 3/2020 | Struhsaker |
| 10,621,551 B2 | 4/2020 | Nishimura |
| 10,643,441 B1 | 5/2020 | Sanchez |
| 10,684,350 B2 | 6/2020 | Dupray |
| 10,728,873 B2 | 7/2020 | Runyon |
| 10,771,926 B1 | 9/2020 | Carr |
| 10,783,419 B2 | 9/2020 | Singh |
| 10,824,771 B2 | 11/2020 | Achillopoulos |
| 10,852,289 B2 | 12/2020 | Troxler |
| 10,852,809 B2 | 12/2020 | Suh |
| 10,877,013 B2 | 12/2020 | Mandava |
| 10,891,582 B2 | 1/2021 | Klingbeil |
| 10,937,292 B2 | 3/2021 | Swayne |
| 10,948,476 B2 | 3/2021 | Troxler |
| 10,969,499 B2 | 4/2021 | Naim |
| 11,074,799 B1 | 7/2021 | Painter |
| 11,129,237 B1 | 9/2021 | Neber |
| 11,184,858 B2 | 11/2021 | Daoura |
| 11,195,184 B1 | 12/2021 | Dixon |
| 11,209,553 B2 | 12/2021 | Linton |
| 11,232,390 B1 | 1/2022 | Leung |
| 11,257,024 B2 | 2/2022 | Barton |
| 11,273,005 B2 | 3/2022 | Beck |
| 11,277,712 B2 | 3/2022 | Guydouk |
| 11,308,441 B2 | 4/2022 | Lau |
| 11,330,419 B2 | 5/2022 | Thomas |
| 11,354,989 B1* | 6/2022 | Sanchez ............... G08B 21/0277 |
| 11,367,322 B2 | 6/2022 | Igein |
| 11,373,506 B1 | 6/2022 | Buena, II |
| 11,785,424 B1 | 10/2023 | Nguyen |
| 2003/0149526 A1 | 8/2003 | Zhou |
| 2004/0192352 A1 | 9/2004 | Vallstrom |
| 2004/0198386 A1 | 10/2004 | Dupray |
| 2004/0266457 A1 | 12/2004 | Dupray |
| 2007/0171048 A1 | 7/2007 | Shapiro |
| 2008/0007398 A1 | 1/2008 | DeRose |
| 2008/0129490 A1 | 6/2008 | Linville |
| 2008/0165056 A1 | 7/2008 | Bader |
| 2008/0186163 A1 | 8/2008 | Mills |
| 2008/0309487 A1 | 12/2008 | Chao |
| 2009/0016308 A1 | 1/2009 | Twitchell, Jr. |
| 2009/0040041 A1 | 2/2009 | Janetis et al. |
| 2009/0061897 A1 | 3/2009 | Hamilton |
| 2009/0072975 A1 | 3/2009 | Arguin |
| 2009/0082040 A1 | 3/2009 | Kahn |
| 2009/0102659 A1 | 4/2009 | Evans |
| 2009/0153401 A1 | 6/2009 | Eitan |
| 2009/0299520 A1 | 12/2009 | Binding |
| 2010/0097208 A1 | 4/2010 | Rosing |
| 2010/0179897 A1 | 7/2010 | Gafford |
| 2011/0156910 A1 | 6/2011 | Pieper |
| 2012/0092215 A1 | 4/2012 | Kwong |
| 2012/0201277 A1 | 8/2012 | Tanner |
| 2012/0206296 A1 | 8/2012 | Wan |
| 2012/0252488 A1 | 10/2012 | Hartmann |
| 2012/0252501 A1 | 10/2012 | Smith |
| 2013/0002481 A1 | 1/2013 | Solomon |
| 2013/0012234 A1 | 1/2013 | Tufty |
| 2013/0066757 A1 | 3/2013 | Lovelace |
| 2013/0150028 A1 | 6/2013 | Akins |
| 2013/0342394 A1 | 12/2013 | Leslie |
| 2013/0344885 A1 | 12/2013 | Parisi |
| 2014/0091138 A1 | 4/2014 | Nordin |
| 2015/0119069 A1 | 4/2015 | Harris |
| 2015/0119070 A1 | 4/2015 | Harris |
| 2015/0223019 A1 | 8/2015 | East |
| 2015/0310716 A1 | 10/2015 | East |
| 2016/0187188 A1 | 6/2016 | Curotto |
| 2016/0328677 A1 | 11/2016 | Ferrer |
| 2016/0338000 A1 | 11/2016 | Halla |
| 2016/0381499 A1 | 12/2016 | Draghici |
| 2017/0019755 A1 | 1/2017 | Thacher |
| 2017/0108261 A1 | 4/2017 | Broussard |
| 2017/0195947 A1 | 7/2017 | Korneluk et al. |
| 2017/0344939 A1 | 11/2017 | Linton |
| 2018/0079591 A1 | 3/2018 | Doty |
| 2018/0342139 A1 | 11/2018 | Otavio |
| 2019/0122511 A1 | 4/2019 | Hicks |
| 2019/0213860 A1* | 7/2019 | Shaprio ............... H04W 4/02 |
| 2019/0303633 A1 | 10/2019 | Pleshek |
| 2019/0317223 A1 | 10/2019 | Czarnecky |
| 2019/0342638 A1* | 11/2019 | Samkowiak ........... B21D 22/02 |
| 2019/0355197 A1 | 11/2019 | Mirpuri |
| 2019/0392385 A1 | 12/2019 | Holatz |
| 2020/0032556 A1 | 1/2020 | Nguyen |
| 2020/0059707 A1* | 2/2020 | Lucrecio ............... G06Q 10/08 |
| 2020/0065751 A1 | 2/2020 | Waters |
| 2020/0074397 A1 | 3/2020 | Burda |
| 2020/0104791 A1 | 4/2020 | Takrouri |
| 2020/0105167 A1 | 4/2020 | Debrody |
| 2020/0200918 A1 | 6/2020 | Wascow |
| 2020/0234548 A1 | 7/2020 | Hicks |

(56) References Cited

U.S. PATENT DOCUMENTS

| | | |
|---|---|---|
| 2020/0241103 A1 | 7/2020 | Vernon |
| 2020/0307614 A1 | 10/2020 | Jordan |
| 2020/0325703 A1 | 10/2020 | Strang |
| 2020/0333426 A1 | 10/2020 | Dupray |
| 2020/0341107 A1 | 10/2020 | Czarnecky |
| 2020/0379079 A1 | 12/2020 | Dupray |
| 2020/0387861 A1 | 12/2020 | Sanglier |
| 2021/0047110 A1 | 2/2021 | Gavin |
| 2021/0049436 A1 | 2/2021 | Nalbant |
| 2021/0081516 A1 | 3/2021 | Storey |
| 2021/0084473 A1 | 3/2021 | Ossin |
| 2021/0089687 A1 | 3/2021 | Achillopoulos |
| 2021/0116578 A1 | 4/2021 | Krzych |
| 2021/0152976 A1 | 5/2021 | Daoura |
| 2021/0165979 A1 | 6/2021 | Wilkinson |
| 2021/0256833 A1 | 8/2021 | Daoura |
| 2021/0327243 A1 | 10/2021 | Franco |
| 2021/0345062 A1 | 11/2021 | Koga |
| 2021/0350318 A1 | 11/2021 | Williamson |
| 2022/0107057 A1 | 4/2022 | Lysenkov |
| 2022/0146059 A1 | 5/2022 | Selevan |
| 2022/0169172 A1 | 6/2022 | Yang |
| 2022/0172163 A1 | 6/2022 | Barton |
| 2022/0180309 A1 | 6/2022 | Burtner |
| 2022/0201427 A1 | 6/2022 | Rechenberger |

FOREIGN PATENT DOCUMENTS

| | | |
|---|---|---|
| JP | 2012028921 A | 2/2012 |
| WO | 2018203205 A1 | 11/2018 |

* cited by examiner

160

170

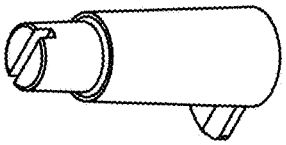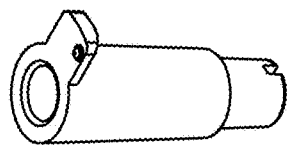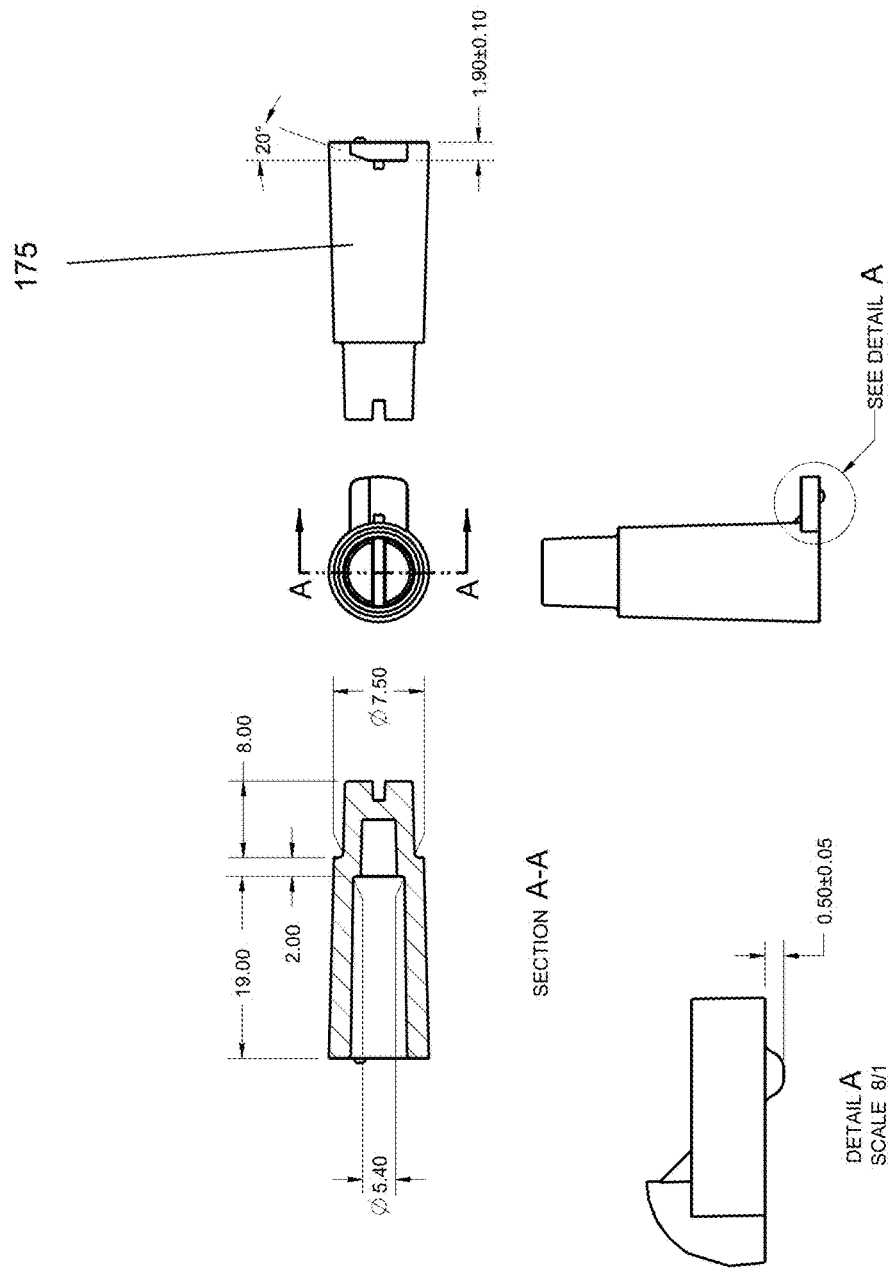
FIG. 13

180

10

180

10

APPARATUS AND METHOD FOR ASSET TRACKING FOR METAL WASTE AND RECYCLING CONTAINERS

RELATED APPLICATIONS

This application claims the benefit, and priority benefit, of U.S. Provisional Patent Application Ser. No. 63/528,235, filed Jul. 21, 2023, and U.S. Provisional Patent Application Ser. No. 63/542,716, filed Oct. 5, 2023, the discourse and contents of each of which are incorporated by reference herein in their entirety.

BACKGROUND

Field of the Invention

The presently disclosed subject matter relates to asset tracking for metal waste and recycling containers.

Description of the Related Art

Roll-off containers, front-end-load containers and intermodal containers can be utilized in connection with waste and recycling pick-up services for customers. Some of these containers are frequently prone to being moved to different parts of a customer location, causing collections drivers to lose track of the containers within a facility.

Additionally, in some areas, intermodal containers are frequently passed between multiple transportation partners and visibility to their location is lost as they are transferred between different modes of transport.

Additionally, out of service containers can be located at container shops waiting to be deployed to future customer locations. Sales and operations teams often do not have great insight into what container assets are available and look to purchase new equipment instead of using what is already available at existing container shops and similar locations.

Most large waste containers are made of metal on at least 5 surfaces (4 side walls and a bottom). It would be logical to assume that these large metal surfaces would be expected to cause interference with radio waves and other electronic signaling produced by a device attached to said container.

Traditionally, antennas are placed on the exterior of a device or as close to the exterior as reasonably possible so as to maximize the effectiveness of such a device and reduce interference.

Improvements in this field of technology are desired.

SUMMARY

Various illustrative embodiments of systems and methods for asset tracking of metal waste and recycling containers are disclosed herein. In certain aspects, the system can include an asset tracking device for tracking the location of a waste container. The asset tracking device can include: a housing attachable to the waste container; a primary control board; an accelerometer; one or more battery packs; and a tracking system consisting of: a GPS receiver, a GPS antenna, a cellular transceiver, and a cellular antenna traced directly onto the primary control board. The primary control board, the accelerometer, the battery pack(s) and the tracking system can be housed within the housing. The housing may also include a button which can be used to iniate communication to a cloud server.

In certain illustrative embodiments, an asset tracking device for tracking the location of a metal waste container is provided. The device can include a housing configured to directly attach to the metal waste container and create a weatherproof seal therewith a plate configured to attach to a side of the housing and enclose contents within the housing, wherein the housing and the plate are sealed together with an O-ring, and wherein the housing has a plurality of corners and the plate is configured to slide into established holes in each corner of the housing; a primary control board comprising a processor; an accelerometer configured to detect whether a motion event for the asset tracking device has occurred; one or more battery packs; a timer configured to measure one or more time intervals; and a tracking system consisting of: a GPS receiver, a GPS antenna, a cellular transceiver, and a cellular antenna traced directly onto the primary control board, wherein the processor is configured to: determine, in communication with the accelerometer and the timer, whether the motion event occurred during the one or more time intervals; direct the GPS receiver to acquire updated GPS location coordinates for the asset tracking device due to the occurrence of the motion event and direct the cellular transceiver to acquire updated location coordinates through cellular tower triangulation and communicate location coordinates. The primary control board, the accelerometer, the one or more battery packs and the tracking system can be housed within the housing. The housing can be configured to enable the use of the metal walls of the container to amplify existing radio signals. The processor can be further configured to acquire location tracking information via a cellular network. The processor can be further configured to communicate the location of the asset tracking device. The asset tracking device can further comprise an ejector pin configured to power-on or power-off the asset tracking device.

In certain illustrative embodiments, a method of tracking the location of a metal waste container having an asset tracking device located thereon is provided. From a sleep mode for the asset tracking device, whether a first predefined time interval has elapsed can be detected. If the first predefined interval has elapsed, the asset tracking device on the metal waste container can be transitioned from the sleep mode to an active mode, and GPS coordinates can be acquired and a location of the metal waste container having an asset tracking device located thereon can be determined based on the GPS coordinates at the end of a subsequent predefined time interval. The determined location of the metal waste container having the asset tracking device located thereon can be communicated. A new predefined interval can be begun and the asset tracking device can be returned to the sleep mode after determining the location of the asset tracking device.

In certain illustrative embodiments, a method of tracking the location of a metal waste container having an asset tracking device located thereon is provided. From a sleep mode for the asset tracking device, whether an initial motion event for the asset tracking device on the metal waste container has occurred can be detected. If the initial motion event has occurred, the asset tracking device on the metal waste container can be transitioned from the sleep mode to an active mode. The asset tracking device on the metal waste container can be monitored for one or more subsequent motion events during a first predefined time period, and if the one or more subsequent motion events occur during the first predefined time period, GPS coordinates associated with the one or more subsequent motion events can be acquired and a location of the asset tracking device on the metal waste container can be determined based on the GPS coordinates. The determined location of the metal waste container having the asset tracking device located thereon can be communicated. A new predefined interval can be begun and the asset tracking device can be returned to the sleep mode after determining the location of the asset tracking device.

In certain illustrative embodiments, a method of tracking the location of a metal waste container having an asset tracking device located thereon is provided. From a sleep mode for the asset tracking device, whether an initial motion event for the asset tracking device on the metal waste container has occurred can be detected. If the initial motion event has occurred, the asset tracking device on the metal waste container can be transitioned from the sleep mode to an active mode. The asset tracking device on the metal waste container can be monitored for one or more subsequent motion events during a first predefined time period. If the one or more subsequent motion events do not occur during the first predefined time period, then after a second predefined time period, GPS coordinates can be acquired and a location of the metal waste container having the asset tracking device located thereon can be determined based on the GPS coordinates. The determined location of the metal waste container having the asset tracking device located thereon can be communicated. A new predefined interval can be begun and the asset tracking device can be returned to the sleep mode after determining the location of the asset tracking device.

BRIEF DESCRIPTION OF THE DRAWINGS

A better understanding of the presently disclosed subject matter can be obtained when the following detailed description is considered in conjunction with the drawings and figures herein, wherein:

FIG. 13 is a collection of various views of an on/off pin for an asset tracker in accordance with an illustrative embodiment of the presently disclosed subject matter;

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to asset tracking for waste and recycling containers. In certain illustrative embodiments, a low-cost GPS location asset tracker can be provided for tracking the whereabouts of waste and recycling containers.

Figure 1A:
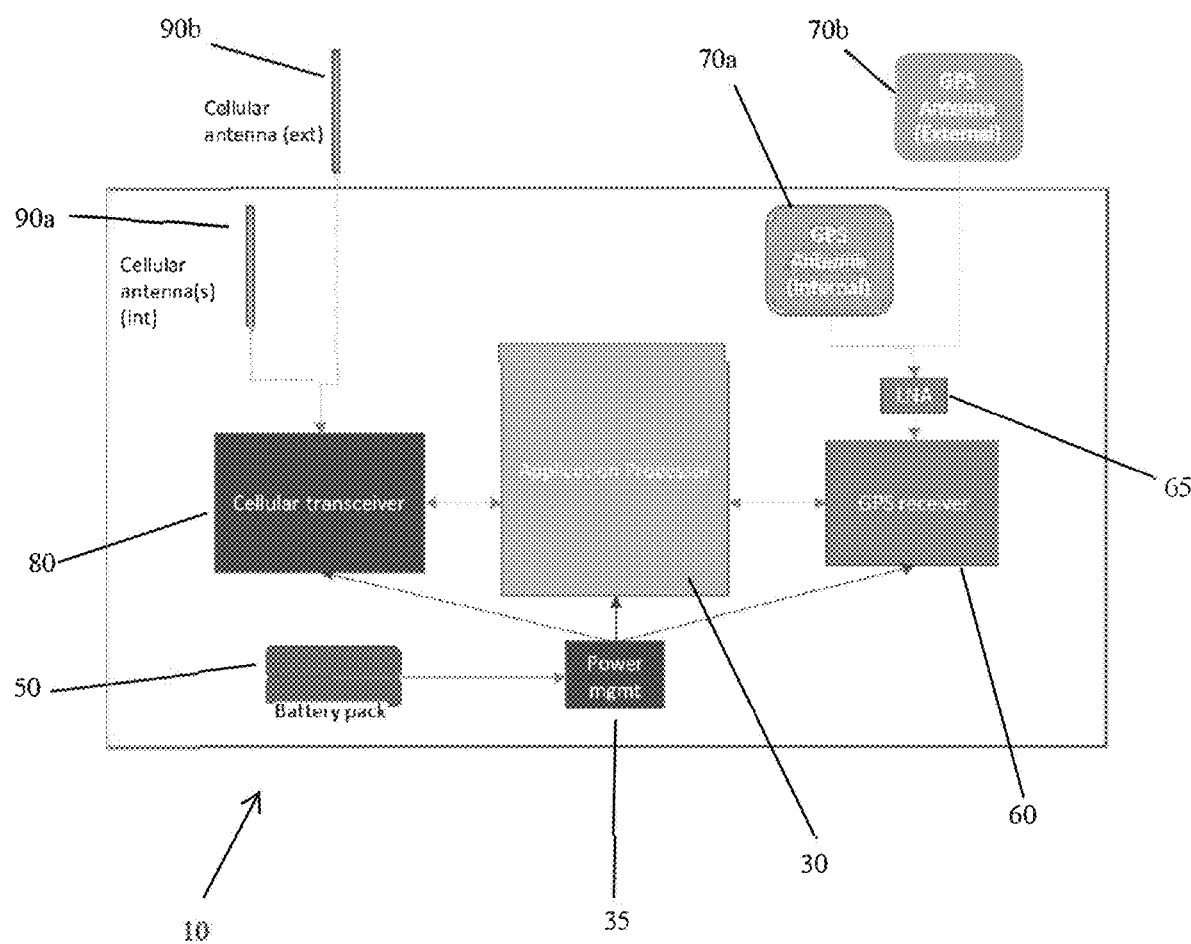
FIG. 1A and FIG. 1B are schematic overviews of an asset tracker in accordance with illustrative embodiments of the presently disclosed subject matter.
Figure 1B:
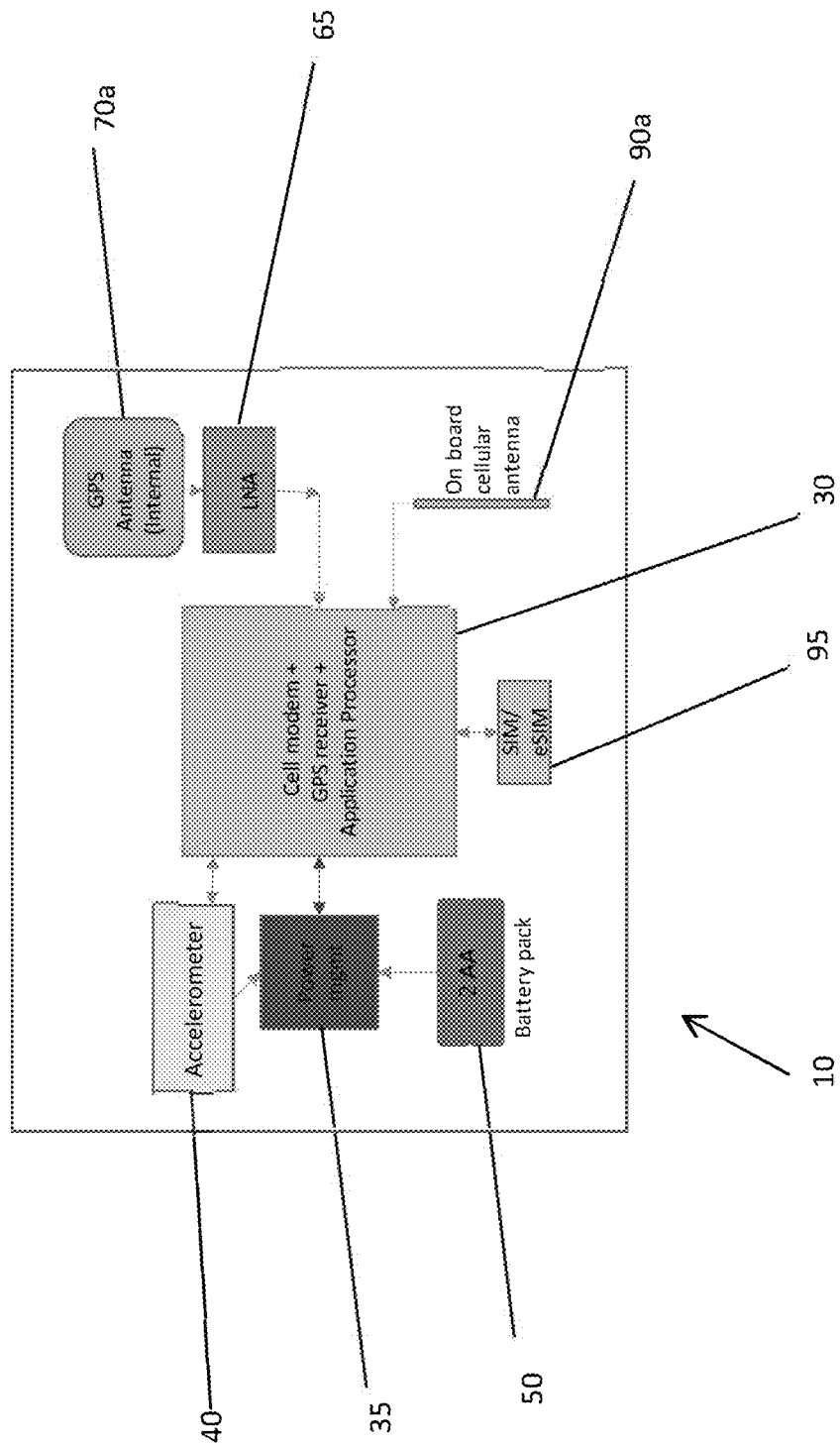

Schematics of illustrative embodiments of an asset tracker 10 are shown in FIG. 1A and FIG. 1B. Asset tracker 10 can include various combinations of: a housing 20 attachable to the waste container; a primary control board comprising an application processor 30; a power management system 35; an accelerometer 40; one or more battery packs 50; and a tracking system consisting of: a GPS receiver 60, a low noise amp (LNA) 65; an internal GPS antenna 70a and/or external GPS antenna 70b, a cellular transceiver 80, a cellular antenna 90a traced directly onto the primary control board; and a SIM/eSIM 95. In certain illustrative embodiments, the various components of asset tracker 10 can be housed inside of housing 20. A cellular antenna 90a external to the housing can also be utilized.

Most current products in this space are "fully loaded," containing a number of technologies designed to establish the location of containers including GPS, cellular, LORAWAN, wifi, etc. By comparison, in certain illustrative embodiments, the presently disclosed asset tracker 10 will seek to use only the minimum number of technologies— e.g., GPS and cellular—in order to produce the desired functioning device at reduced cost.

In certain illustrative embodiments, the asset tracker 10 can include a chipset on primary control board 30 such as (but not limited to) a Nordic Cellular and GPS chipset (nRF9160), configured to minimize the size and cost of the enclosure. The asset tracker 10 can also utilize 2 (two) AA batteries in battery pack 50 that are estimated to provide up to 5 years of battery life. The asset tracker 10 can be equipped with an accelerometer 40, in order to maximize battery life and minimize GPS locking durations. The accelerometer 40 can act as a mechanism to trigger a report of a motion event. The asset tracker 10 can be equipped with a timer to enable a wake from low power mode and to prompt the asset tracker 10 to look for new GPS coordinates or repeat/reuse the existing coordinates if the asset tracker 10 (and therefore, the container) has not moved within a set number of recording intervals. This functionality can save battery life by not waiting for the GPS lock to occur and keeping the device on longer than needed.

Figure 2:
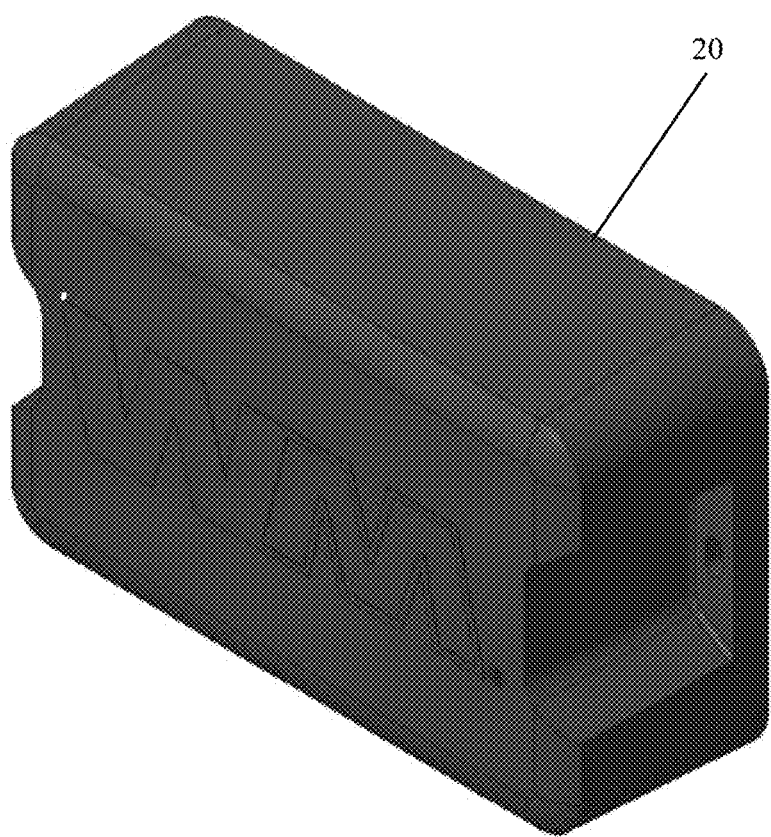
FIG. 2 is a housing for an asset tracker in accordance with an illustrative embodiment of the presently disclosed subject matter.

In certain illustrative embodiments, the asset tracker 10 can include a large housing 20 for housing the components thereof, as shown in FIG. 2. The housing 20 can be attached directly to the waste container, in order to maintain a weatherproof design. The electronics for the asset tracker 10 can be placed on a control board located vertically in parallel to the mounting surface.

Figure 3:
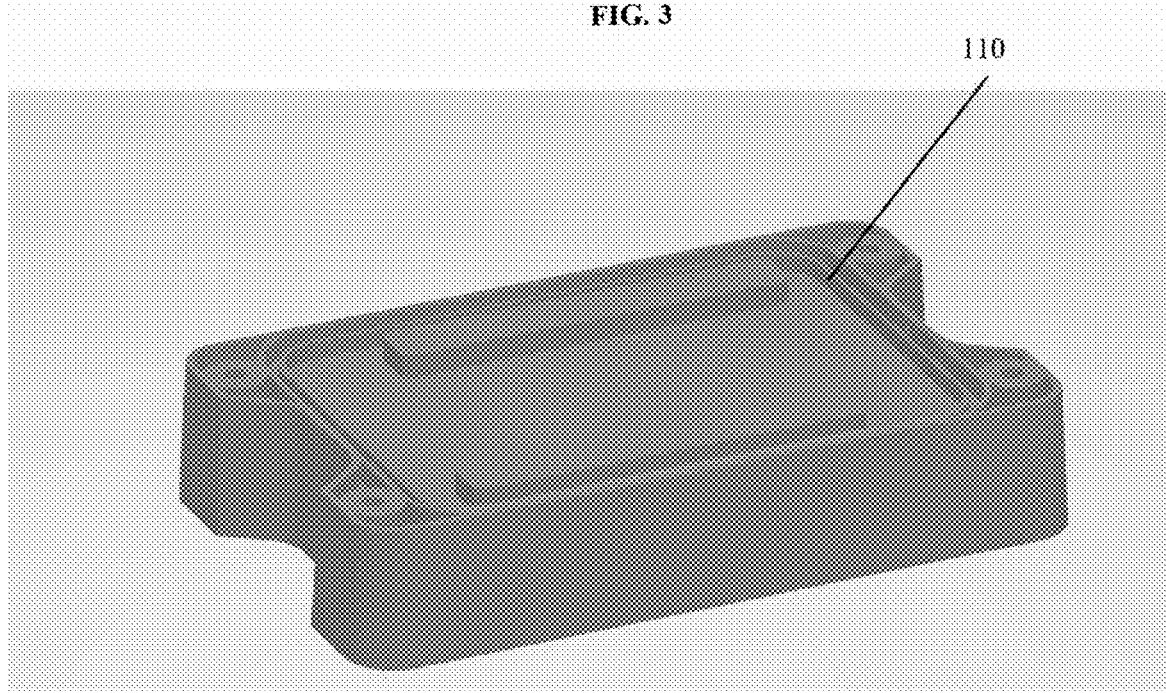
FIG. 3 is a plate for the housing of an asset tracker in accordance with an illustrative embodiment of the presently disclosed subject matter.

In certain illustrative embodiments, the asset tracker 10 can be enclosed via a plate 110 running along the backside of the housing 100 and sliding into established holes in each corner, as shown in FIG. 3, that can be sealed via O-ring.

In certain illustrative embodiments, plate 110 is configured or positioned to enable the use of the metal walls of the container to amplify existing radio signals. The antenna 90 can be configured or positioned in a way that uses the metal container to amplify the electronic communications signal. For example, the antenna 90 can be oriented parallel to the side of the metal container, at a close enough distance from the container to provide the desired enhanced signal, whereas conventional wisdom would allege that an antenna should be located far away from the metal container sides.

Figure 4:
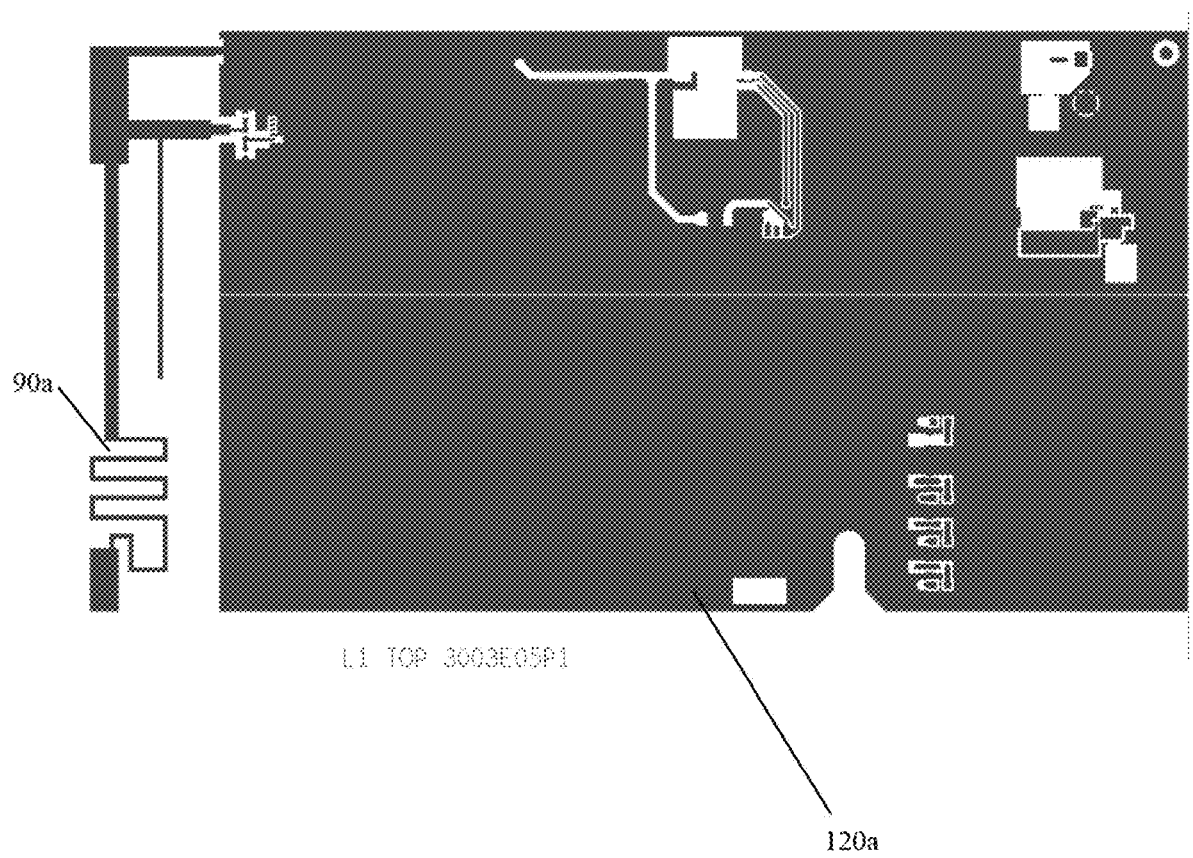
FIG. 4 is a primary control board (PCB) for an asset tracker in accordance with an illustrative embodiment of the presently disclosed subject matter.
Figure 5:
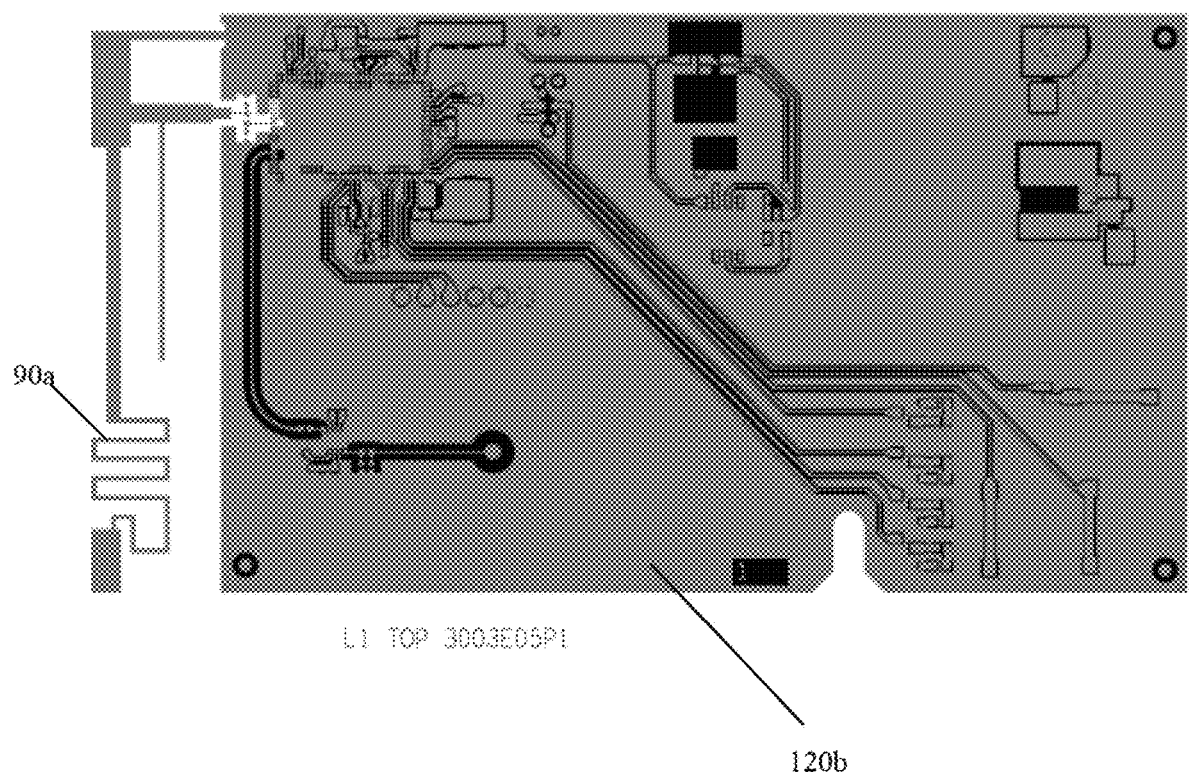
FIG. 5 is a primary control board (PCB) for an asset tracker in accordance with an illustrative embodiment of the presently disclosed subject matter.
Figure 6:
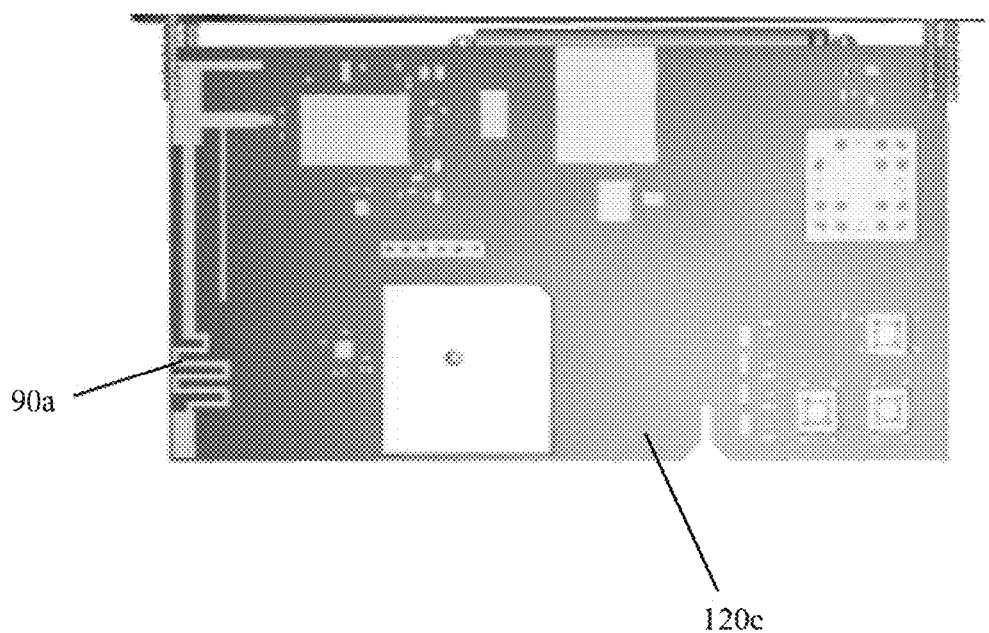
FIG. 6 is a primary control board (PCB) for an asset tracker in accordance with an illustrative embodiment of the presently disclosed subject matter.

Various illustrative embodiments of the primary control board (PCB) 120 for the asset tracker 10 are shown in FIGS. 4-6. Primary control board (PCB) 120a is shown in FIG. 4, primary control board (PCB) 120b is shown in FIG. 5, and primary control board (PCB) 120c is shown in FIG. 6. In certain illustrative embodiments, the asset tracker 10 can include an antenna 90a for the cellular radio. The antenna 90 can be traced directly onto the primary control board (PCB) 120 in lieu of a cellular antenna chip (see the left side of the images in FIGS. 4-6). This will result in lower manufacturing costs due to less manufacturing time and the added cost of an externally-located antenna.

In certain illustrative embodiments, the asset tracker 10 can utilize strictly location-based asset management using only GPS and cellular. Many existing designs are focused on the automation of waste management processes, such as unlocking the container, fill sensors, etc., rather than asset management as described herein. The cellular transceiver 80 can also acquire updated location coordinates through cellular tower triangulation, such as SCELL or MCELL, and communicate location coordinates.

Figure 7:
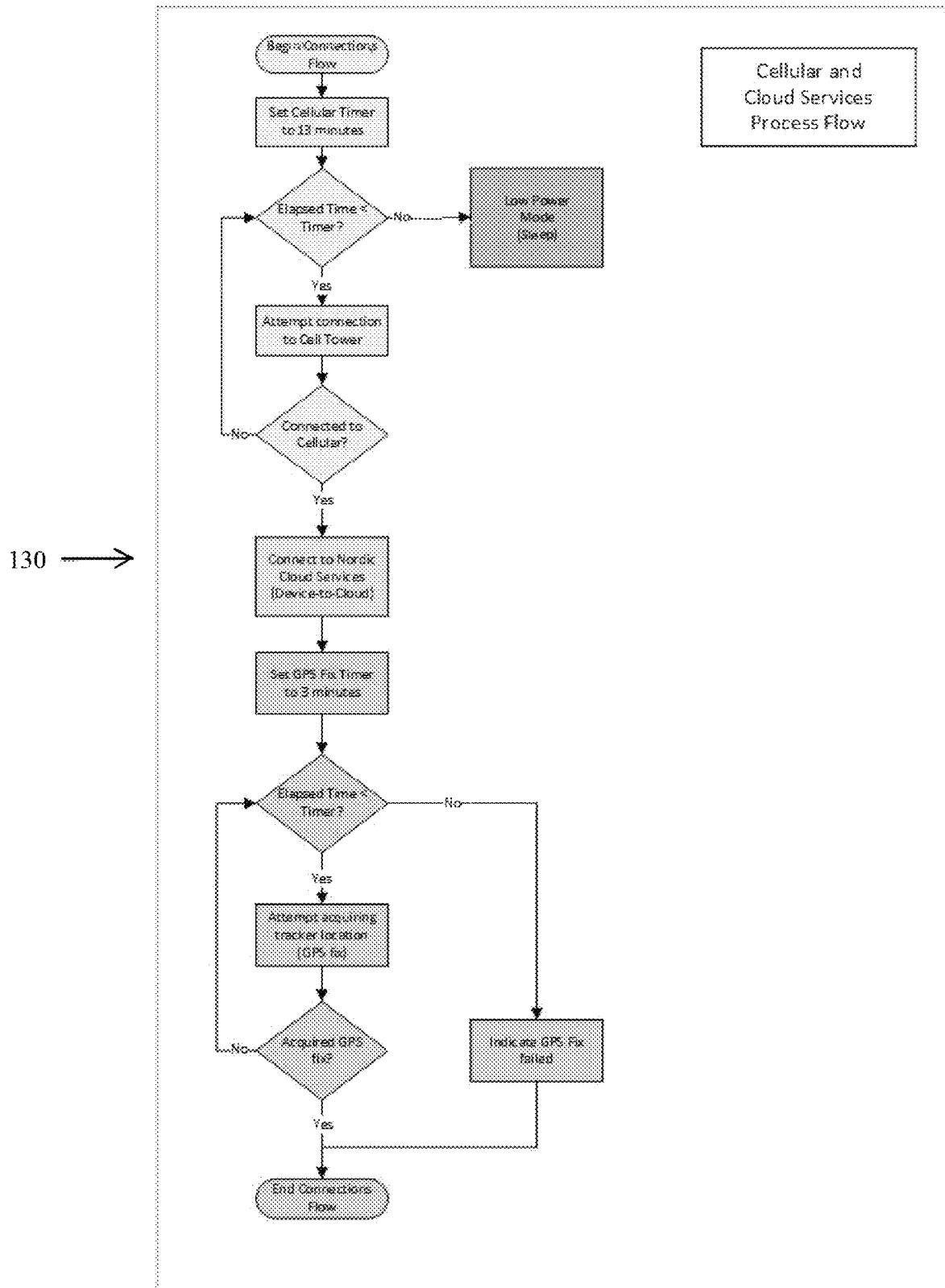
FIG. 7 is a process flow for cellular and cloud services for an asset tracker in accordance with an illustrative embodiment of the presently disclosed subject matter.

In certain illustrative embodiments, the asset tracker 10 can be configured to limit the amount of communication with the cellular network to minimize power usage and optimize battery life, (thus making the device last longer) as well as limit the amount of data usage and associated costs. A diagram of this process 130 is shown in FIG. 7.

Figure 8:
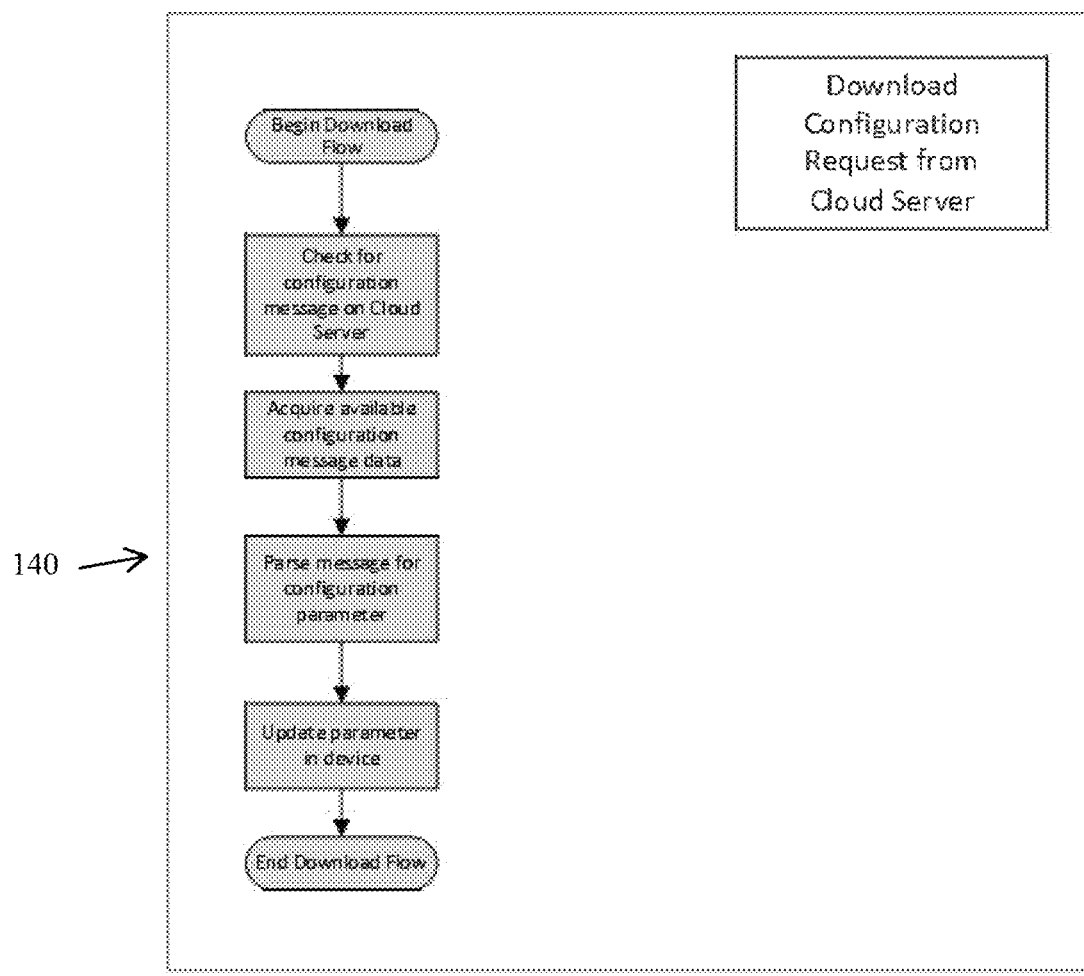
FIG. 8 is a process flow for a download configuration request from a cloud server for an asset tracker in accordance with an illustrative embodiment of the presently disclosed subject matter.

In certain illustrative embodiments, two-way messaging can be established, and such configuration of communications may be adjusted using a series of configuration codes that identify configuration states that may include variable parameters such as wake frequency, frequency of location measurement, communication frequency, etc. A diagram of this process 140 is shown in FIG. 8.

In certain illustrative embodiments, a button can be located on the device housing and connected to the appropriate mechanisms within the housing so as to iniate a message back to the cloud server.

Figure 9:
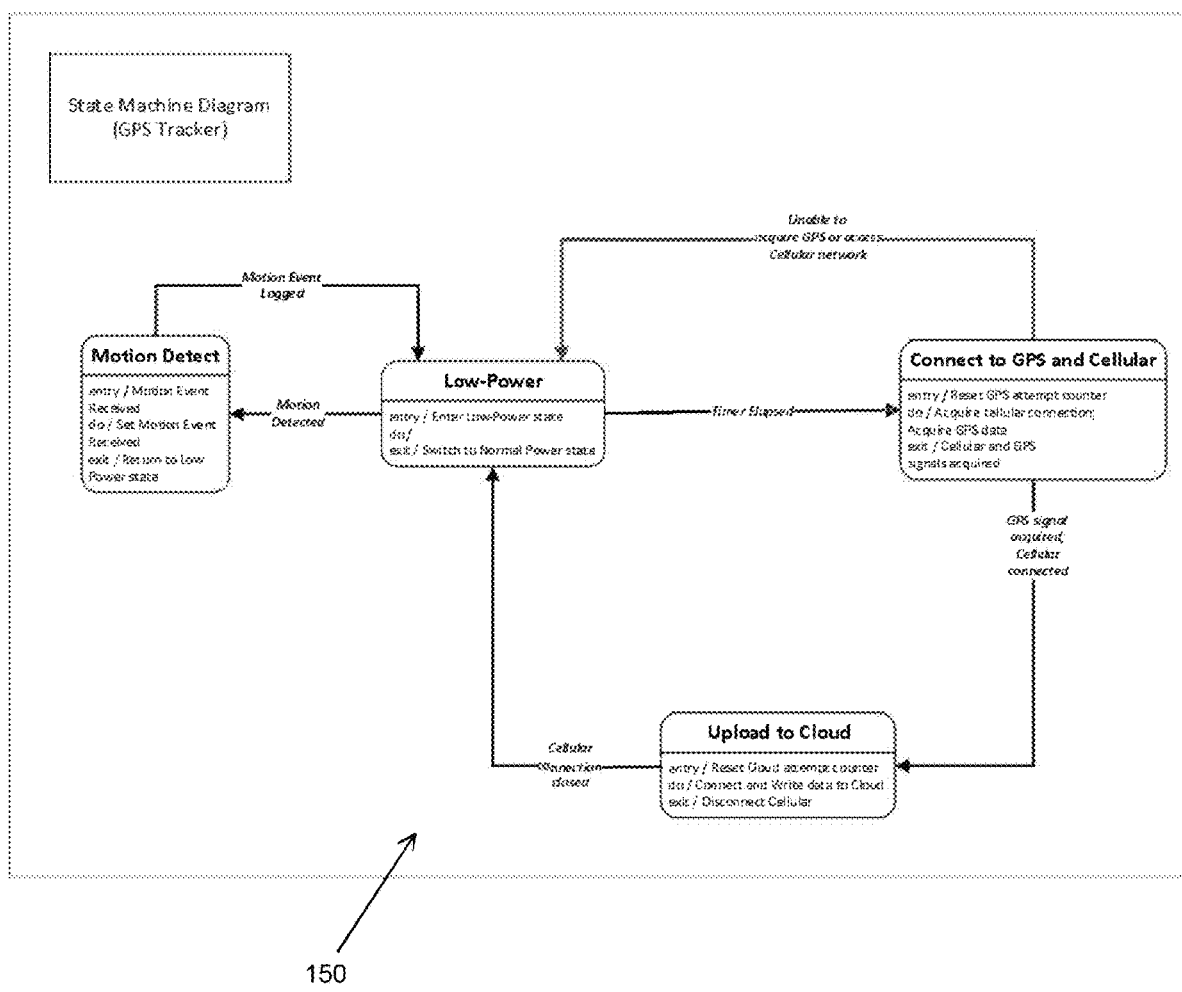
FIG. 9 is a process flow for a state machine diagram (GPS Tracker) for an asset tracker in accordance with an illustrative embodiment of the presently disclosed subject matter.

A system state diagram 150 for an illustrative embodiment of the asset tracker 10 is shown in FIG. 9. The diagram 150 indicates the various events in the process which causes a "trigger" in order to move on to the next state.

Figure 10:
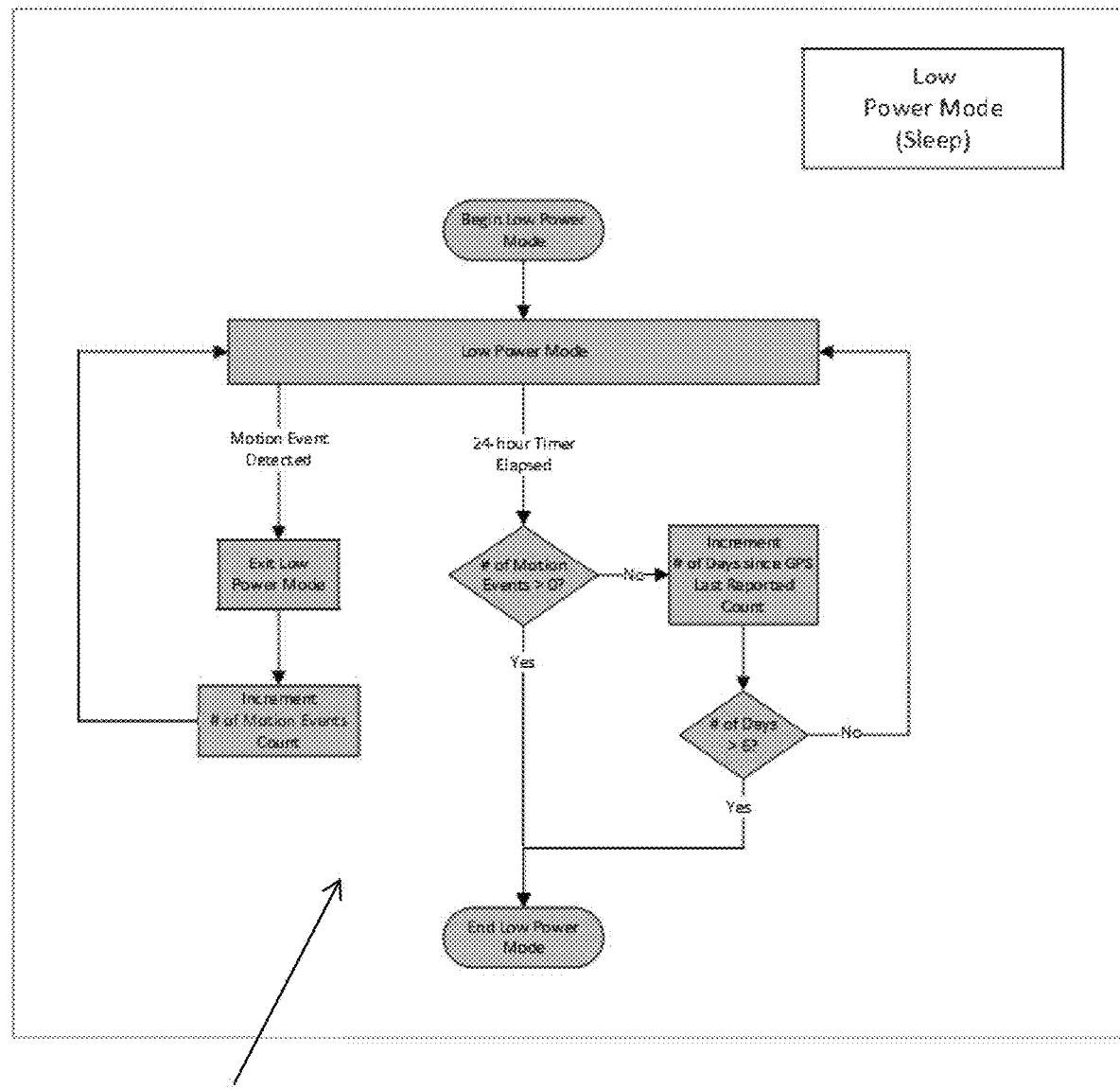
FIG. 10 is a process flow for activating low power mode (sleep) for an asset tracker in accordance with an illustrative embodiment of the presently disclosed subject matter.

In certain illustrative embodiments, the asset tracker 10 will be capable of starting up and acquiring a signal at regular intervals, such as daily by default, but can be configured to only transmit new coordinates (via cellular network) when those coordinates have significantly changed. Otherwise, it will either submit no signal or submit a different message indicating no movement. This will significantly reduce the amount of data transmitted and extend battery life. A diagram for this process 160 is shown in FIG. 10.

Figure 11:
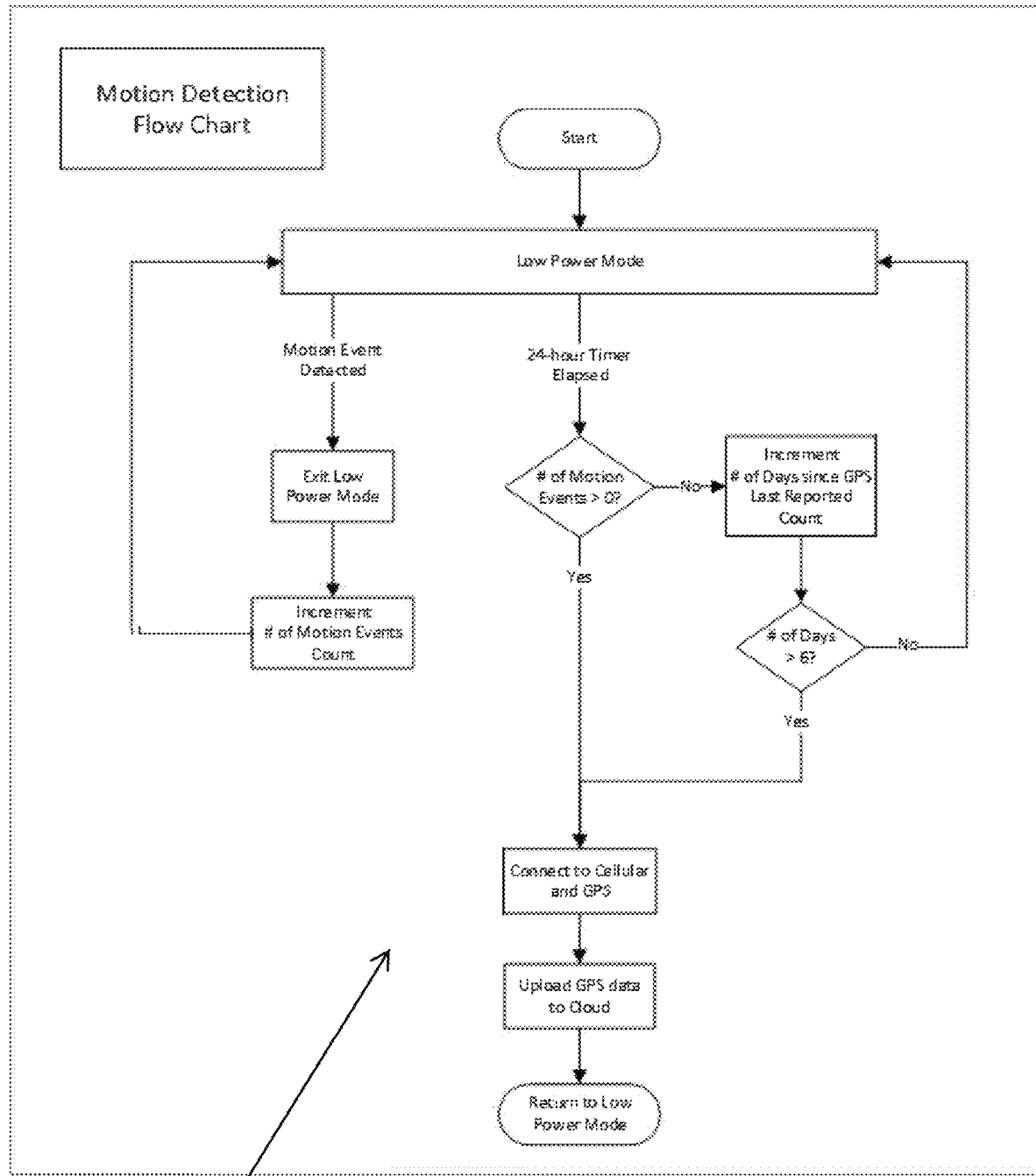
FIG. 11 is a process flow for motion detection for an asset tracker in accordance with an illustrative embodiment of the presently disclosed subject matter.

In certain illustrative embodiments, the asset tracker 10 can utilize logic to detect movement, acquire a GPS signal, and report location. A motion detection flow diagram 170 for an illustrative embodiment of the asset tracker 10 is shown in FIG. 11. The motion detection flow diagram 170 focuses on accelerometer functionality as well as the 24-hour timer used in conjunction with detecting motion events from the accelerometer. By using the ability to detect motion events, which will occur when the asset tracker 10 and attached waste container are moved, the asset tracker's use of battery power should be more efficient. The asset tracker 10 can also keep track of the last time the GPS location was reported to the cloud, by using a 24-hour timer and counting the number of times a motion event was detected during that period.

In certain illustrative embodiments, the motion detection steps can include: (i) accelerometer will check movement; (ii) if movement detected, will exit low power mode and record a motion event; (iii) upon elapse of 24-hours or other programmed interval, the asset tracker 10 can utilize logic to count the number of motion events during recorded interval; (iv) if motion events are recorded, asset tracker 10 can acquire new GPS coordinates, and report its new location back to the cloud via a LTE-M network; (v) if motion events are not recorded, asset tracker 10 can utilize logic to count the number of 24-hour or other programmed intervals since last report of motion events; and (vi) if number of 24-hour or other programmed intervals is above a programmed threshold, such as 6 days by default, asset tracker 10 can acquire GPS coordinates and report its location back to the cloud via a LTE-M network.

Additionally, in certain illustrative embodiments, the asset tracker 10 can use a cellular network to acquire GPS ephemeris data and augmented GPS/A-GPS data to accelerate speed of location acquisition via GPS satellite.

Figure 12:
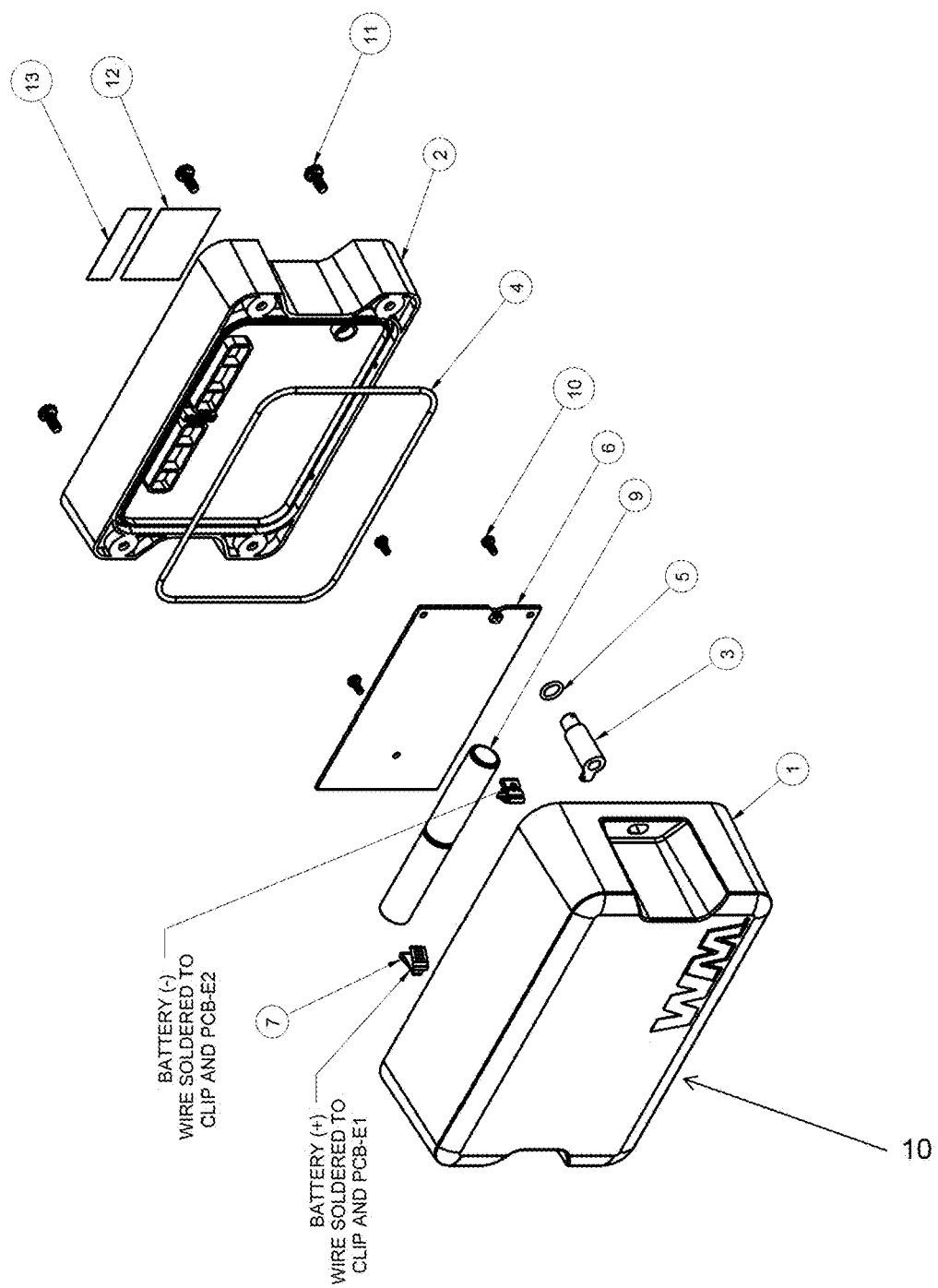
FIG. 12 is an exploded view of an asset tracker in accordance with an illustrative embodiment of the presently disclosed subject matter.

FIG. 12 is an exploded view of an asset tracker 10 in accordance with an illustrative embodiment of the presently disclosed subject matter.

The asset tracker 10 can have the following components, as indicated in Table 1 below:

TABLE 1

| | |
|---|---|
| 1 | Front housing |
| 2 | Back housing |
| 3 | On/Off Pin (aka Ejector Pin) |
| 4 | Housing gasket |
| 5 | O-Ring, Silicon Size 011 |
| 6 | PCB assembly |
| 7 | Battery clip |
| 8 | Battery Wire - 20 AWG stranded |
| 9 | AA battery |
| 10 | Screw, #4 x 1/4" thd frm, pan hd, torx drive |

TABLE 1-continued

| 11 | Screw, #8 × 3/8" thd frm, pan hd, torx drive |
| 12 | Product label |
| 13 | Identification label |

In certain illustrative embodiments, to further the battery life of the device, the asset tracker 10 can be equipped with an ejector pin 175, as shown in FIG. 13 and FIG. 12, item no. 3, which is installed after factory testing and configured to to enable the device to be powered off for transport to the end user and activated at the time of installation.

Figure 14:
FIG. 14 is a top perspective view of a battery pack for an asset tracker in accordance with an illustrative embodiment of the presently disclosed subject matter.
Figure 15:
FIG. 15 is a top perspective view of an asset tracker without a battery pack in accordance with an illustrative embodiment of the presently disclosed subject matter.
Figure 16:
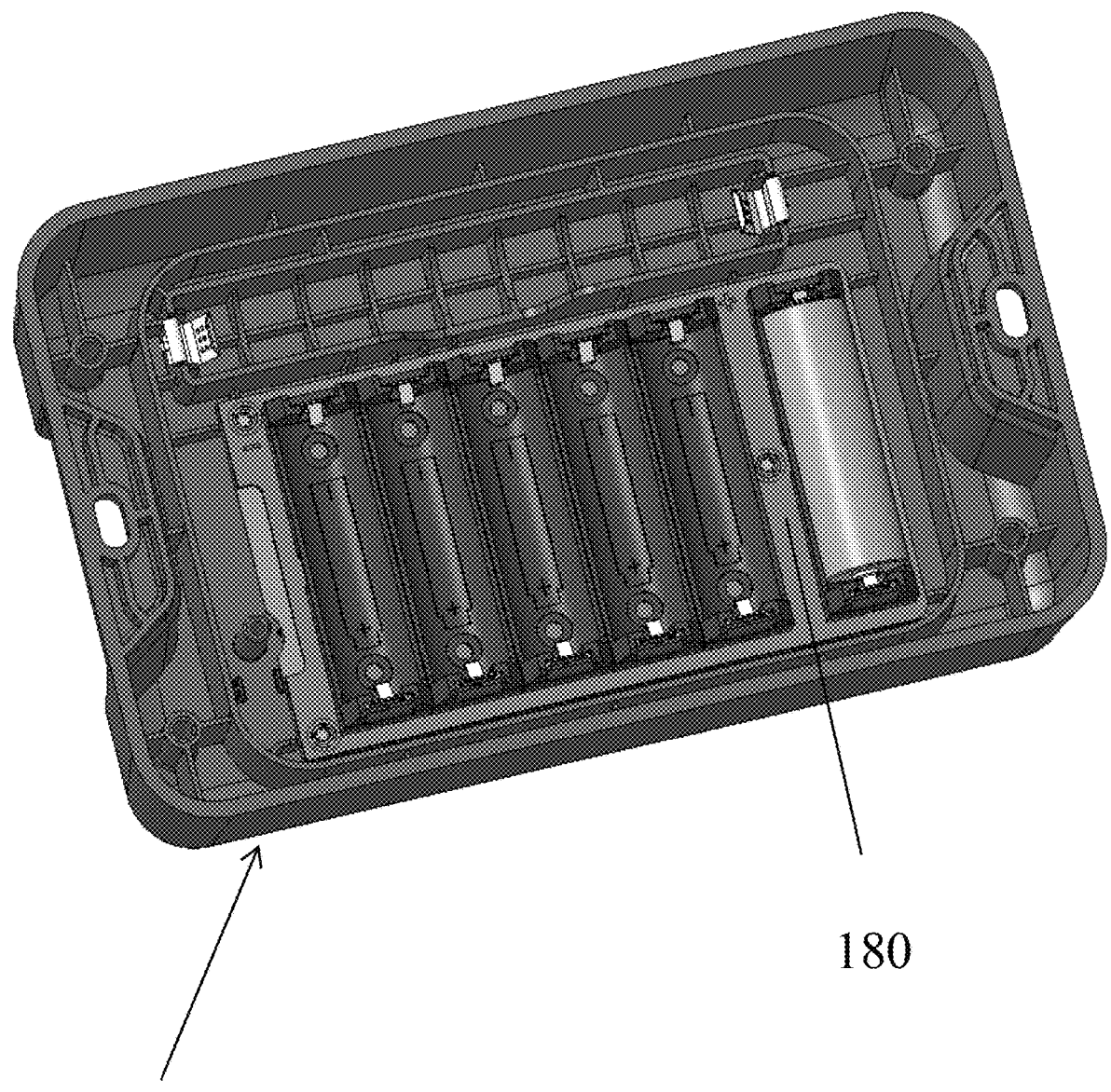
FIG. 16 is a top perspective view of an asset tracker with a battery pack in accordance with an illustrative embodiment of the presently disclosed subject matter.

In certain illustrative embodiments, to extend the life of the device, the asset tracker 10 can be configured to create capacity for additional batteries, as shown in FIGS. 14-16. FIG. 14 is a top perspective view of a battery pack 180 for an asset tracker. FIG. 15 is a top perspective view of an asset tracker 10 without a battery pack 180. FIG. 16 is a top perspective view of an asset tracker 10 with a battery pack 180.

Various illustrative embodiments of systems and methods for asset tracking of metal waste and recycling containers are disclosed herein. In certain aspects, the system can include an asset tracking device for tracking the location of a waste container. The asset tracking device can include: a housing attachable to the waste container; a primary control board; an accelerometer; one or more battery packs; and a tracking system consisting of: a GPS receiver, a GPS antenna, a cellular transceiver, and a cellular antenna traced directly onto the primary control board. The primary control board, the accelerometer, the battery pack(s) and the tracking system can be housed within the housing. The housing may also include a button which can be used to iniate communication to a cloud server.

In certain illustrative embodiments, an asset tracking device 10 for tracking the location of a metal waste container is provided. The device can include a housing 20 configured to directly attach to the metal waste container and create a weatherproof seal therewith; a plate 110 configured to attach to a side of the housing 20 and enclose contents within the housing 20, wherein the housing 20 and the plate 110 are sealed together with an O-ring, and wherein the housing 20 has a plurality of corners and the plate 110 is configured to slide into established holes in each corner of the housing 20; a primary control board comprising a processor 30; an accelerometer 40 configured to detect whether a motion event for the asset tracking device 10 has occurred; one or more battery packs 50; a timer configured to measure one or more time intervals; and a tracking system consisting of: a GPS receiver 60, a GPS antenna 70, a cellular transceiver 80, and a cellular antenna 90 traced directly onto the primary control board, wherein the processor 30 is configured to: determine, in communication with the accelerometer 40 and the timer, whether the motion event occurred during the one or more time intervals; direct the GPS receiver 60 to acquire updated GPS location coordinates for the asset tracking device 10 due to the occurrence of the motion event and direct the cellular transceiver 80 to acquire updated location coordinates through cellular tower triangulation and communicate location coordinates. The primary control board, the accelerometer 40, the one or more battery packs 50 and the tracking system can be housed within the housing 20. The housing 20 can be configured to enable the use of the metal walls of the container to amplify existing radio signals. The processor 30 can be further configured to acquire location tracking information via a cellular network. The processor 30 can be further configured to communicate the location of the asset tracking device 10. The asset tracking device 10 can further comprise an ejector pin 175 configured to power-on or power-off the asset tracking device 10.

In certain illustrative embodiments, a method of tracking the location of a metal waste container having an asset tracking device located thereon is provided. From a sleep mode for the asset tracking device, whether a first predefined time interval has elapsed can be detected. If the first predefined interval has elapsed, the asset tracking device on the metal waste container can be transitioned from the sleep mode to an active mode, and GPS coordinates can be acquired and a location of the metal waste container having an asset tracking device located thereon can be determined based on the GPS coordinates at the end of a subsequent predefined time interval. The determined location of the metal waste container having the asset tracking device located thereon can be communicated. A new predefined interval can be begun and the asset tracking device can be returned to the sleep mode after determining the location of the asset tracking device.

In certain illustrative embodiments, a method of tracking the location of a metal waste container having an asset tracking device located thereon is provided. From a sleep mode for the asset tracking device, whether an initial motion event for the asset tracking device on the metal waste container has occurred can be detected. If the initial motion event has occurred, the asset tracking device on the metal waste container can be transitioned from the sleep mode to an active mode. The asset tracking device on the metal waste container can be monitored for one or more subsequent motion events during a first predefined time period, and if the one or more subsequent motion events occur during the first predefined time period, GPS coordinates associated with the one or more subsequent motion events can be acquired and a location of the asset tracking device on the metal waste container can be determined based on the GPS coordinates. The determined location of the metal waste container having the asset tracking device located thereon can be communicated. A new predefined interval can be begun and the asset tracking device can be returned to the sleep mode after determining the location of the asset tracking device.

In certain illustrative embodiments, a method of tracking the location of a metal waste container having an asset tracking device located thereon is provided. From a sleep mode for the asset tracking device, whether an initial motion event for the asset tracking device on the metal waste container has occurred can be detected. If the initial motion event has occurred, the asset tracking device on the metal waste container can be transitioned from the sleep mode to an active mode. The asset tracking device on the metal waste container can be monitored for one or more subsequent motion events during a first predefined time period. If the one or more subsequent motion events do not occur during the first predefined time period, then after a second predefined time period, GPS coordinates can be acquired and a location of the metal waste container having the asset tracking device located thereon can be determined based on the GPS coordinates. The determined location of the metal waste container having the asset tracking device located thereon can be communicated. A new predefined interval can be begun and the asset tracking device can be returned to the sleep mode after determining the location of the asset tracking device.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

What is claimed is:

1. An asset tracking device for tracking a location of a metal waste container, comprising:
   a housing configured to directly attach to the metal waste container and create a weatherproof seal therewith;
   a plate configured to attach to a side of the housing and enclose contents within the housing, wherein the housing and the plate are sealed together with an O-ring, and wherein the housing has a plurality of corners and the plate is configured to slide into established holes in each corner of the housing;
   a primary control board comprising a processor;
   an accelerometer configured to detect whether a motion event for the asset tracking device has occurred;
   one or more battery packs;
   a timer configured to measure one or more time intervals; and
   a tracking system consisting of:
      a GPS receiver,
      a GPS antenna,
      a cellular transceiver, and
      a cellular antenna traced directly onto the primary control board,
   wherein the processor is configured to:
      determine, in communication with the accelerometer and the timer, whether the motion event occurred during the one or more time intervals;
      direct the GPS receiver to acquire updated GPS location coordinates for the asset tracking device due to the occurrence of the motion event; and
      direct the cellular transceiver to acquire updated location coordinates through cellular tower triangulation and communicate location coordinates,
   and wherein the metal waste container amplifies signals for the tracking system.

2. The asset tracking device of claim 1, wherein the primary control board, the accelerometer, the one or more battery packs and the tracking system are housed within the housing.

3. The asset tracking device of claim 2, wherein the housing is configured to enable the use of the metal walls of the container to amplify existing radio signals.

4. The asset tracking device of claim 1, wherein the processor is further configured to acquire location tracking information via a cellular network.

5. The asset tracking device of claim 1, wherein the processor is further configured to communicate the location of the asset tracking device.

6. The asset tracking device of claim 1, further comprising an ejector pin configured to power-on or power-off the asset tracking device.

* * * * *